United States Patent
Shreve et al.

(10) Patent No.: US 11,917,289 B2
(45) Date of Patent: Feb. 27, 2024

(54) SYSTEM AND METHOD FOR INTERACTIVE FEEDBACK IN DATA COLLECTION FOR MACHINE LEARNING IN COMPUTER VISION TASKS USING AUGMENTED REALITY

(71) Applicant: Palo Alto Research Center Incorporated, Palo Alto, CA (US)

(72) Inventors: Matthew A. Shreve, Campbell, CA (US); Robert R. Price, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/840,358

(22) Filed: Jun. 14, 2022

(65) Prior Publication Data

US 2023/0403459 A1    Dec. 14, 2023

(51) Int. Cl.
| | |
|---|---|
| G06V 10/774 | (2022.01) |
| G06V 10/776 | (2022.01) |
| H04N 5/77 | (2006.01) |
| H04N 13/207 | (2018.01) |
| G06V 10/94 | (2022.01) |

(Continued)

(52) U.S. Cl.
CPC .......... *H04N 23/64* (2023.01); *G06V 10/774* (2022.01); *G06V 10/776* (2022.01); *G06V 10/945* (2022.01); *H04N 5/77* (2013.01); *H04N 13/207* (2018.05); *H04N 23/632* (2023.01); *G06V 2201/10* (2022.01)

(58) Field of Classification Search
CPC .... H04N 23/64; H04N 13/207; H04N 23/632; H04N 5/77; G06V 10/774; G06V 10/776; G06V 10/945; G06V 2201/10

USPC .......................................................... 348/46
See application file for complete search history.

(56) References Cited

U.S. PATENT DOCUMENTS

| | | |
|---|---|---|
| 10,147,023 B1 | 12/2018 | Klaudiny |
| 10,229,539 B2 | 3/2019 | Shikoda |

(Continued)

OTHER PUBLICATIONS

J. L. Pech-Pacheco et al. "Diatom autofocusing in brightfield microscopy: a comparative study" IEEE 2000.

(Continued)

*Primary Examiner* — Thai Q Tran
*Assistant Examiner* — Nienru Yang
(74) *Attorney, Agent, or Firm* — Shun Yao; Yao Legal Services, Inc.

(57) ABSTRACT

A system is provided which obtains images of a physical object captured by an AR recording device in a 3D scene. The system measures a level of diversity of the obtained images, for a respective image, based on at least: a distance and angle; a lighting condition; and a percentage of occlusion. The system generates, based on the level of diversity, a first visualization of additional images to be captured by projecting, on a display of the recording device, first instructions for capturing the additional images using the AR recording device. The system trains a model based on the collected data. The system performs an error analysis on the collected data to estimate an error rate for each image of the collected data. The system generates, based on the error analysis, a second visualization of further images to be captured. The model is further trained based on the collected data.

20 Claims, 10 Drawing Sheets
(3 of 10 Drawing Sheet(s) Filed in Color)

(51) Int. Cl.
*H04N 23/63* (2023.01)
*H04N 23/60* (2023.01)

(56) References Cited

U.S. PATENT DOCUMENTS

| | | | |
|---|---|---|---|
| 10,304,159 | B2 | 5/2019 | Aoyagi |
| 10,366,521 | B1 | 7/2019 | Peacock |
| 11,256,958 | B1 * | 2/2022 | Subbiah ............... G06F 18/2155 |
| 2008/0189083 | A1 | 8/2008 | Schell |
| 2010/0040272 | A1 | 2/2010 | Zheng |
| 2012/0200601 | A1 | 8/2012 | Osterhout |
| 2013/0127980 | A1 | 5/2013 | Haddick |
| 2015/0037775 | A1 | 2/2015 | Ottensmeyer |
| 2016/0260261 | A1 | 9/2016 | Hsu |
| 2016/0292925 | A1 | 10/2016 | Montgomerie |
| 2016/0328887 | A1 | 11/2016 | Elvezio |
| 2016/0335578 | A1 | 11/2016 | Sagawa |
| 2016/0349511 | A1 | 12/2016 | Meiron |
| 2017/0366805 | A1 | 12/2017 | Sevostianov |
| 2018/0035606 | A1 | 2/2018 | Burdoucci |
| 2018/0204160 | A1 | 7/2018 | Chehade |
| 2018/0315329 | A1 | 11/2018 | D'Amato |
| 2018/0336732 | A1 | 11/2018 | Schuster |
| 2019/0156202 | A1 | 5/2019 | Falk |
| 2019/0362556 | A1 | 11/2019 | Ben-Dor |
| 2020/0081249 | A1 | 3/2020 | Brusnitsyn |
| 2020/0210780 | A1 | 7/2020 | Torres |
| 2021/0243362 | A1 * | 8/2021 | Castillo ................. G06V 10/26 |
| 2021/0350588 | A1 | 11/2021 | Tanida |

OTHER PUBLICATIONS

Said Pertuz et al. "Analysis of focus measure operators in shape-from-focus", Research gate Nov. 2012, Article Received Jun. 3, 2011, Received in Revised form Oct. 15, 2012, Accepted Nov. 7, 2012, Available online Nov. 16, 2012.

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* * Section IV* * Figure 6 *.

Georgios Georgakis et al., "Multiview RGB-D Dataset for Object Instance Detection", 2016 Fourth International Conference on 3D Vision (3DV), Sep. 26, 2016, pp. 426-434. *Abstract* *Section 3*.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. *abstract* *Section III*.

Pat Marion et al., "LabelFusion: A Pipeline for Generating Ground Truth Labels for Real RGBD Data of Cluttered Scenes", Jul. 15, 2017, retrieved form the Internet: URL: https://arxiv.org/pdf/1707.04796.pdf. *abstract* *Section 111*.

Alhaija et al., "Augmented Reality Meets Computer Vision: Efficient Data Generation for Urban Driving Scenes", Aug. 4, 2017.

Kaiming He, Georgia Gkioxari, Piotr Dollar Ross Girshick, "Mask R-CNN", arXiv:1703.06870v1 [cs.CV] Mar. 20, 2017.

Umar Iqbal, Anton Milan, and Juergen Gall, "PoseTrack: Joint Multi-Person Pose Estimation and Tracking ", arXiv:1611.07727v3 [ cs.CV] Apr. 7, 2017.

Ohan Oda, etal.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).

Mueller, How To Get Phone Notifications When Your Brother HL-3170CDW Printer Runs Out Of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/ p-strong-epson-printer-says-out-of-paper-but-it-isnt-strong-p-p-p (Year: 2018).

Adepu et al. Control Behavior Integrity for Distributed Cyber-Physical Systems (Year: 2018).

Khurram Soomro "UCF101: A Dataset of 101 Human Actions Classes From Videos in The Wild" Dec. 2012.

* cited by examiner

SYSTEM AND METHOD FOR INTERACTIVE FEEDBACK IN DATA COLLECTION FOR MACHINE LEARNING IN COMPUTER VISION TASKS USING AUGMENTED REALITY

RELATED APPLICATION

This application is related to:

U.S. Pat. No. 10,699,165, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 29 Nov. 2017 and issued 30 Jun. 2020 (hereinafter "the '165 patent"), and U.S. Pat. No. 11,200,457, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 23 Apr. 2020 and issued 14 Dec. 2021 (hereinafter "the '457 patent"), where the '165 patent and the '457 patent claim the benefit and priority of U.S. Provisional Application No. 62/579,000, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 30 Oct. 2017, the disclosures of which is incorporated by reference herein.

BACKGROUND

Field

This disclosure is generally related to computer vision systems. More specifically, this disclosure is related to a system and method for interactive feedback in data collection for machine learning in computer vision tasks using augmented reality (AR).

Related Art

The robustness and generality of machine learning models for computer vision tasks (such as object detection) depend on the quality, diversity, and coverage of the training dataset. An increase in the size of the dataset may not improve the performance of a machine learning model if examples in the dataset are similar. The quality of the images may also affect the performing of the model. A significantly number of excessively blurry or dark images or images taken from a same viewpoint may make it infeasible to train a model. Thus, building a robust visual object detector may require technicians to obtain or capture images with high quality that cover all the conditions expected in the final application. However, current techniques do not provide a systematic process for collecting a sufficient number and quality of images which cover the required conditions, e.g., space of views, lighting condition, occlusions, motion blur, and other confounding factors.

Without such a systematic process, current techniques may result in an inability to quantify the quality of a collected dataset. As a result, datasets with uneven quality may result in object detectors with poor or low generality, which may require costly return trips to the field to fill in the holes in the coverage. In addition, a challenge remains in ensuring confidence regarding the state of coverage of any given dataset.

SUMMARY

One embodiment provides a system which facilitates facilitating interactive feedback in data collection for machine learning using AR. During operation, the system obtains a plurality of images of a physical object captured by a recording device in a scene associated with a three-dimensional (3D) world coordinate frame. The system measures a level of diversity of the obtained images based on at least: a distance and angle between the recording device and the physical object in a respective image; a lighting condition associated with the respective image; and a percentage of occlusion of the physical object in the respective image. The system generates, based on the level of diversity, a first visualization of additional images which need to be captured by projecting, on a display of the recording device, first instructions for capturing the additional images using augmented reality (AR) features of the recording device. The system trains a model based on collected data which comprises the obtained images and the additional images. The system performs an error analysis on the collected data by combining multiple folds of cross-validation in training the model to estimate an error rate for each image of the collected data. The system generates, based on the error analysis, a second visualization of further images which need to be captured by projecting, on the display, second instructions for capturing the further images, wherein the further images are part of the collected data, and wherein the model is further trained based on the collected data.

In some embodiments, the plurality of images include annotations and are associated with metadata and measuring the level of diversity is further based on the metadata. The metadata comprise at least one of: the distance and the angle between the recording device and the physical object in the respective image; the lighting condition associated with the respective image; the percentage of occlusion of the physical object in the respective image; an amount of blur associated with the respective image; and a state of the physical object in the respective image.

In some embodiments, the metadata comprises at least one of: information supplied by a user associated with capturing the respective image; and information determined by the recording device in capturing the respective image.

In some embodiments, training the model based on the collected data is responsive to determining that a level of diversity of the collected data is greater than a first predetermined threshold.

In some embodiments, performing the error analysis on the collected data is responsive to receiving a request from a user associated with the recording device.

In some embodiments, the first instructions include one or more of: arrows, waypoints, and animations using the AR features; a heatmap indicating a total coverage of the physical object based on colors mapped to multiple faces of a geodesic polyhedron surrounding the physical object in the respective image; a summary report which lists a number of views taken of the physical object and other physical objects in the scene; and a radar plot indicating a number of views per azimuth angle taken of the physical object.

In some embodiments, the second instructions include: a heatmap comprising a geodesic polyhedron with multiple faces surrounding the physical object in the respective image, wherein a first color on a first face indicates an error rate below a first predetermined error rate and a second color on a second face indicates an error rate above a second predetermined error rate.

In some embodiments, the system performing the error analysis on the collected data comprises generating a respective fold of the cross-validation by: splitting, based on a first random split, the collected data into a training set and a test set of images; training the model on the training set of images; and training the model on the test set of images, wherein the first random split is different from other random splits used in generating other folds of the multiple folds of the cross-validation.

In some embodiments, the multiple folds are combined to estimate the error rate for each image of the collected data based on at least one of: a class of the physical object in a respective image; the angle of view of the physical object from the recording device in the respective image; the distance between the recording device and the physical object in the respective image; the lighting condition associated with the respective image; the percentage of occlusion of the physical object in the respective image; an amount of blur associated with the respective image; and a state of the physical object in the respective image.

In some embodiments, the system iterates through measuring the level of diversity of the collected data, generating the first visualization by projecting the first instructions for capturing additional images, and obtaining the additional images until the measured level of diversity is greater than a first predetermined threshold.

In some embodiments, responsive to determining that the level of diversity of the collected data is greater than a second predetermined threshold, the system performs the following operations. The system presents, to a user associated with the recording device, an output of the trained model, wherein the trained model is loaded into a data capture tool associated with the recording device. The system views, by the user in real-time, the scene from multiple views, wherein the scene includes multiple objects associated with multiple sets of collected data comprising images of each object. The system determines which of the multiple objects are detected and whether the first or the second instructions appear on the display. Responsive to determining that a respective object is not detected or that an additional image based on the first instructions or a further image based on the second instructions needs to be captured, the system performs, by the user using the data capture tool associated with the recording device, at least one of: adjusting a bounding box associated with the respective object; and adding or capturing another image to the collected data for the respective object.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1:
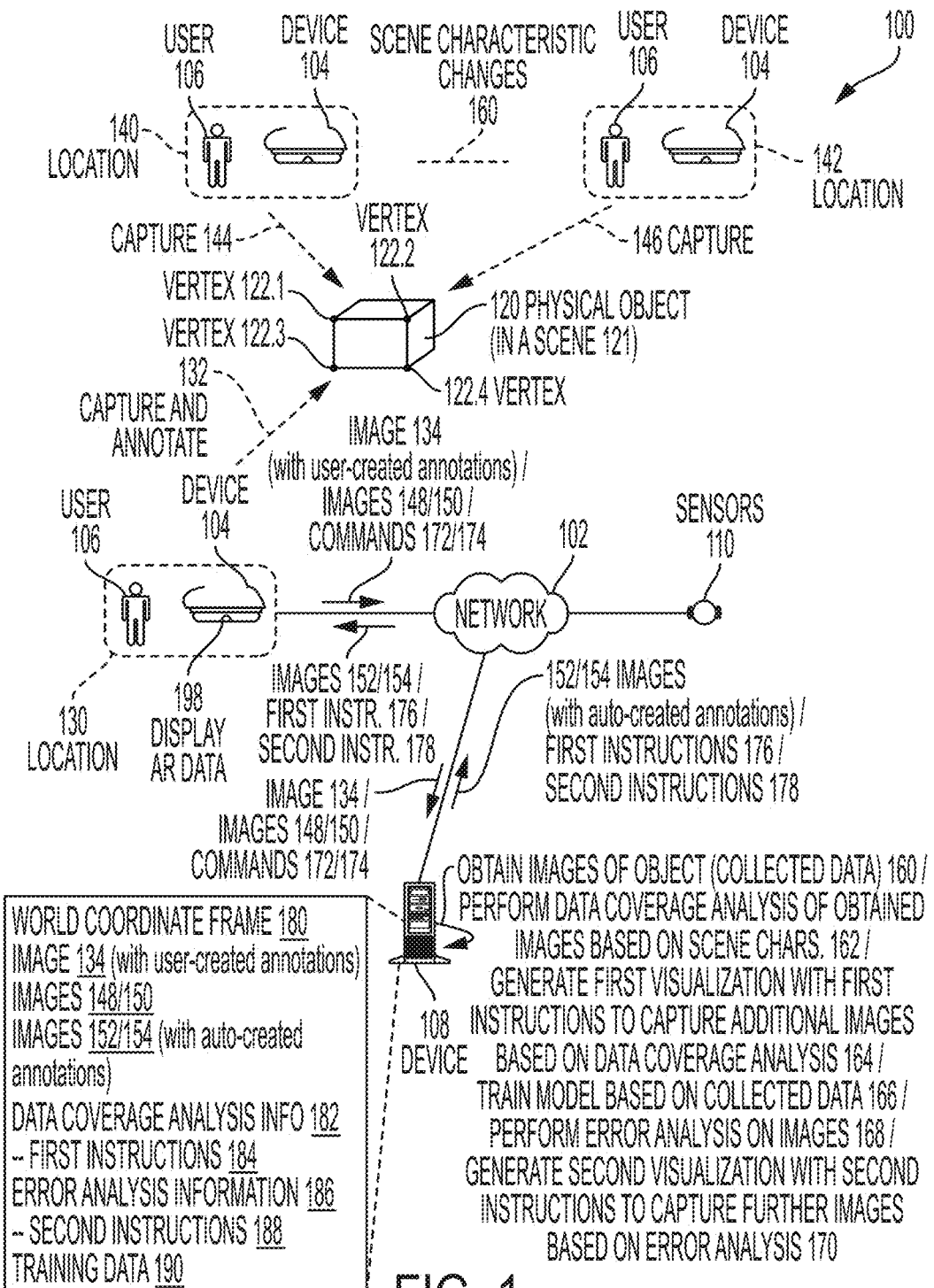
FIG. 1 illustrates an exemplary environment for facilitating interactive feedback in data collection for machine learning using AR, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of providing a systematic process to quantify the quality of a dataset (e.g., images of physical objects) in machine learning for computer vision tasks. The system can provide both real-time analysis of the images during the capture process and offline analysis using a trained model.

Computer vision tasks may require voluminous labeled datasets. Creating these labeled datasets for use in current machine learning technology may involve inefficient approaches such as: deploying a technician to the field to capture images of objects from different poses and under different conditions; crowd-sourcing images from client; or utilizing public social media sites. A human may then manually label or draw bounding boxes around each individual image in a large dataset of images. This manual labeling may require many man-hours, given the intensive nature of the labeling process. Some current techniques may reduce the burden of manual label, such as propagating labels between related frames in a video. The '165 and '457 patents describe a method for accelerated labeling of images using projection of 3D labels anchored in a world frame (based on SLAM techniques) into 2D image frames, as depicted below in relation to FIGS. 3 and 4. However, current techniques do not ensure quality of coverage or viewing conditions, nor do they provide quality estimates of individual images.

The instant embodiments address these challenges by providing a system with both real-time and offline analysis. The real-time analysis can provide interactive feedback to a user (e.g., a technician capturing images on an AR recording device). The feedback can include information about the quality of images captured and a status on the coverage of viewing conditions for a respective object (e.g., related to coverage on pose and view, lighting conditions, occlusion, and blurriness). The feedback can also be used to provide quantitative descriptions of coverage of a collected dataset for assessing the quality of the dataset and to reason about the utility of merging datasets.

Real-time feedback in the form of visualizations using AR can include, e.g.: arrows, waypoints, and animations using AR features; and a heatmap indicating a total coverage of the physical object based on colors mapped to multiple faces of a geodesic polyhedron surrounding the physical object in the respective image, as described below in relation to FIGS. 5A and 5B.

The offline analysis can be provided as part of data coverage analysis or error analysis, as described below in relation to FIG. 2. Offline feedback can include user guidance (or "instructions") with summary reports and radar plots, as described below in relation to FIGS. 6A and 6B. In some embodiments, this offline feedback may be presented on a display of the recording device in real-time.

Exemplary Environment and Flow for Interactive Feedback in Data Collection for Machine Learning Using AR FIG. 1 illustrates an exemplary environment 100 for facilitating interactive feedback in data collection for machine learning using AR, in accordance with an embodiment of the present invention. Environment 100 can include: a device 104 and an associated user 106; a device 108; a physical object 120; and sensors 110. Device 104 can include an augmented reality device (such as a Microsoft HoloLens). Physical object 120 can be part of a scene 121 (not shown) which has an associated 3D world coordinate frame. Device 108 can include a server or other computing device which can receive, transmit, and store data, and can perform algorithms to: project vertices into images taken from multiple perspectives in the 3D world coordinate frame; perform data coverage analysis; perform error analysis; and train a model. Sensors 110 and other tracking sensors (not shown) can work together with device 104 in a system to capture images, annotate images, determine 3D coordinates, store annotated images, project images, and display projected images. Device 104, device 108, and sensors 110 can communicate via a network 102.

User 106 can use device 104 from various locations in scene 121 to capture images and metadata for physical objects of interest in the scene, e.g., physical object 120. During this capturing stage, device 108 can provide immediate online feedback to user 106, with information regarding data coverage on the captured images (i.e., performing a dynamic real-time data coverage analysis) (via functions 162 and 164). The immediate online feedback can be a first visualization in the form of first instructions for user 106 (function 164). When a certain number of images have been collected (i.e., a current "collected dataset"), device 108 (or user 106 via a command sent from device 104 to device 108) can train a model on the current collected dataset and perform an error analysis on the collected dataset (via functions 166 and 168). Device 108 can generate a second visualization in the form of second instructions for user 106 (function 170). These functions are described below.

During operation, user 106 can use device 104 from a location 130 in the 3D world coordinate frame to capture and annotate (function 132) an image 134 of physical object 120, and send image 134 (with user-created annotations) to device 108. Device 108 can receive image 134 (with user-created annotations). Annotated image 134 can include multiple marked vertices which are associated with 3D coordinates in the 3D world coordinate frame.

User 106 can subsequently use device 104 from other locations (e.g., locations 140 and 142, which are different from location 130) to capture (via, e.g., functions 144 and 146) images 148/150 of physical object 120 in scene 121, and send images 148/150 to device 108. In one embodiment, scene characteristic changes 160 associated with images 148/150 can differ based on location (including distance and angle of view from different locations 140 and 142). For example, user 106 can take a video by walking around physical object 120 in scene 121, where multiple frames of the video can correspond to images 148/150. In another embodiment, scene characteristic changes 160 associated with images 148/150 may differ based on a changed lighting, occlusion, or blur condition (not shown).

Upon receiving images 148/150, device 108 can perform an algorithm to project the marked vertices from image 134 onto images 148/150, and send corresponding images 152/154 (with auto-created annotations) back to user 106, to be displayed on device 104. Projecting 2D labels onto images of a physical object in a scene based on user-annotated 3D labels anchored in a world frame is described in the '165 and '457 patents. The projected labels and annotations can be projected and viewed as display AR data 198, which can include annotations as described below in relation to FIGS. 3 and 4 as well as instructions, heatmaps, tables, radar plots, summary reports, and other instructions using AR features as described below in relation to FIGS. 5A-B, 6A-B, and 7.

Device 108 can store data, such as: a world coordinate frame 180, which corresponds to scene 121 and describes an environment that includes physical object 120; image 134 (with user-created annotations); images 148/150; images 152/154 (with auto-created annotations); data coverage analysis information 182, including first instructions 184; and error analysis information, including second instructions 188. Device 108 can also store, as a "collection of data," "collected data," or a "collected dataset," training data 190, which can include images 134, 148/150, and 152/154. In some embodiments, device 108 stores only images 152/154 with the auto-created images and does not separately store the original images 148/150.

Subsequent to receiving, auto-annotating, and storing images (such as images 134, 148/150, and 152/154), device 108 can obtain images of a physical object (as collected data) (function 160). In response to obtaining the images, or in response to receiving a user command 172 to perform data coverage analysis on the collected data, device 108 can perform data coverage analysis of the collected data (obtained images) based on the scene characteristics (function 162). The data coverage analysis can include measuring a level of diversity of the collected data based on the scene characteristics, which can include at least: a distance and angle between the recording device 104 and physical object 120 in a respective image; a lighting condition associated with the respective image; a percentage of occlusion of physical object 120 in the respective image; and an amount of blur in the respective image.

Device 108 can generate a first visualization with first instructions to capture additional images based on the data coverage analysis (e.g., the measured level of diversity) (function 164). Device 108 can send first instructions 176 back to device 104, and device 104 can project on its display the first visualization (displayed instructions 176 via display AR data 198) as guidance for user 106 to capture additional images using AR features of device 104. For example, displayed first instructions 176 can include arrows, waypoints, and animations displayed on device 104 using the AR features, as described below in relation to FIG. 5A. Displayed first instructions 176 can include a heatmap which indicates a total coverage of the object using colors mapped to multiple faces of a geodesic polyhedron surrounding the physical object, as described below in relation to FIG. 5B. The heatmap can be dynamically updated on the display as the user walks around the object while using device 104 to view the object. In addition to indicating a location from which the additional images should be captured, displayed first instructions 176 can include lighting conditions, occlusion information, and blur information as scene characteristics under which conditions the additional images should be captured.

Based on the first visualization of first instructions 176 (projected as 198), user 106 can capture additional images (via, e.g., functions 144 and 146) and send the additional images to device 108 (e.g., as images 148/150) to be stored for further automatic annotation and analysis. Device 108 can again perform the data coverage analysis on the collected data (function 162) and, if needed, generate another set of first instructions for user 106 (function 164). The display of device 104 can be constantly updated in real-time as: the user walks around the object; the system performs automatic data coverage analysis (162) and generates first instructions (164); the user is given first instructions 176 (which are displayed or projected as 198) to capture additional images; the user captures the additional images from the indicated position or under the indicated scene characteristic or condition; and the model is trained based on the current collected data (166).

When the measured level of diversity of the collected data is greater than a first predetermined threshold, device 108 can train a model based on the collected data (function 166). Device 108 can also perform an error analysis on the collected data (function 168). In some embodiments, the error analysis can be performed in response to receiving a command 174 from user 106 (via device 104). The error analysis can be performed on the collected data by combining multiple folds of cross-validation in training the model to estimate an error rate for each image of the collected data, as described below in relation to FIGS. 2, 7, 8B, and 8C. Device 108 can generate a second visualization with second instructions to capture further images based on the error analysis (function 170). Device 108 can send second instructions 178 back to device 104, and device 104 can project on its display the second visualization (displayed instructions 178 via display AR data 198) as guidance for user 106 to capture further images using AR features of device 104. For example, displayed second instructions 178 can include a heatmap of a geodesic polyhedron with multiple face surrounding the physical object, where a certain color on one or more faces corresponds to a "low" error rate (e.g., below a first predetermined error rate) and another color one or more other faces corresponds to a "high" error rate (e.g., above a second predetermined error rate), as described below in relation to FIG. 7. Displayed second instructions 178 can also include user guidance similar to that provided in displayed first instructions 176. More than two colors may be used to indicate a corresponding number of predetermined error rates or ranges of error rates.

Based on the second visualization of second instructions 178 (projected as 198), user 106 can capture further images (via, e.g., functions 144 and 146) and send the further images to device 108 (e.g., as images 148/150) to be stored for further automatic annotation and analysis. Device 108 can again train the model based on the current collected dataset (function 166), perform the error analysis on the collected data (function 168), and, if needed, generate another set of second instructions for user 106 (function 170). The display of device 104 can be constantly updated in real-time as: the user walks around the object; the system performs automatic error analysis (168) and generates second instructions (170); the user is given second instructions 178 (which are displayed or projected as 198) to capture further images; the user captures the further images from the indicated position or under the indicated scene characteristic or condition; and the model is trained based on the current collected dataset (166).

As part of the automatic data coverage analysis (162) and the automatic error analysis (168), device 108 can generate and store, respectively, certain data coverage analysis information 182 and error analysis information 186. Data analysis coverage information 182 can include, e.g., first instructions 184 and other reports, such as a summary report and a radar plot, as described below in relation to FIGS. 6A and 6B. Error analysis information 186 can include, e.g., second instructions 188 and other information, as described below in relation to FIG. 7. Functions 162 and 164 can be automatic or responsive to a user command to perform data coverage analysis (as in command 172), and functions 168 and 170 can also be automatic or responsive to a user command to perform error analysis (as in command 174). Device 108 can also store the collected training data (190), e.g., including image 134, images 148/150, images 152/154, additional images captured based on first instructions 176, and further images captured based on second instructions 178.

Scene Annotation Using AR

Figure 2:
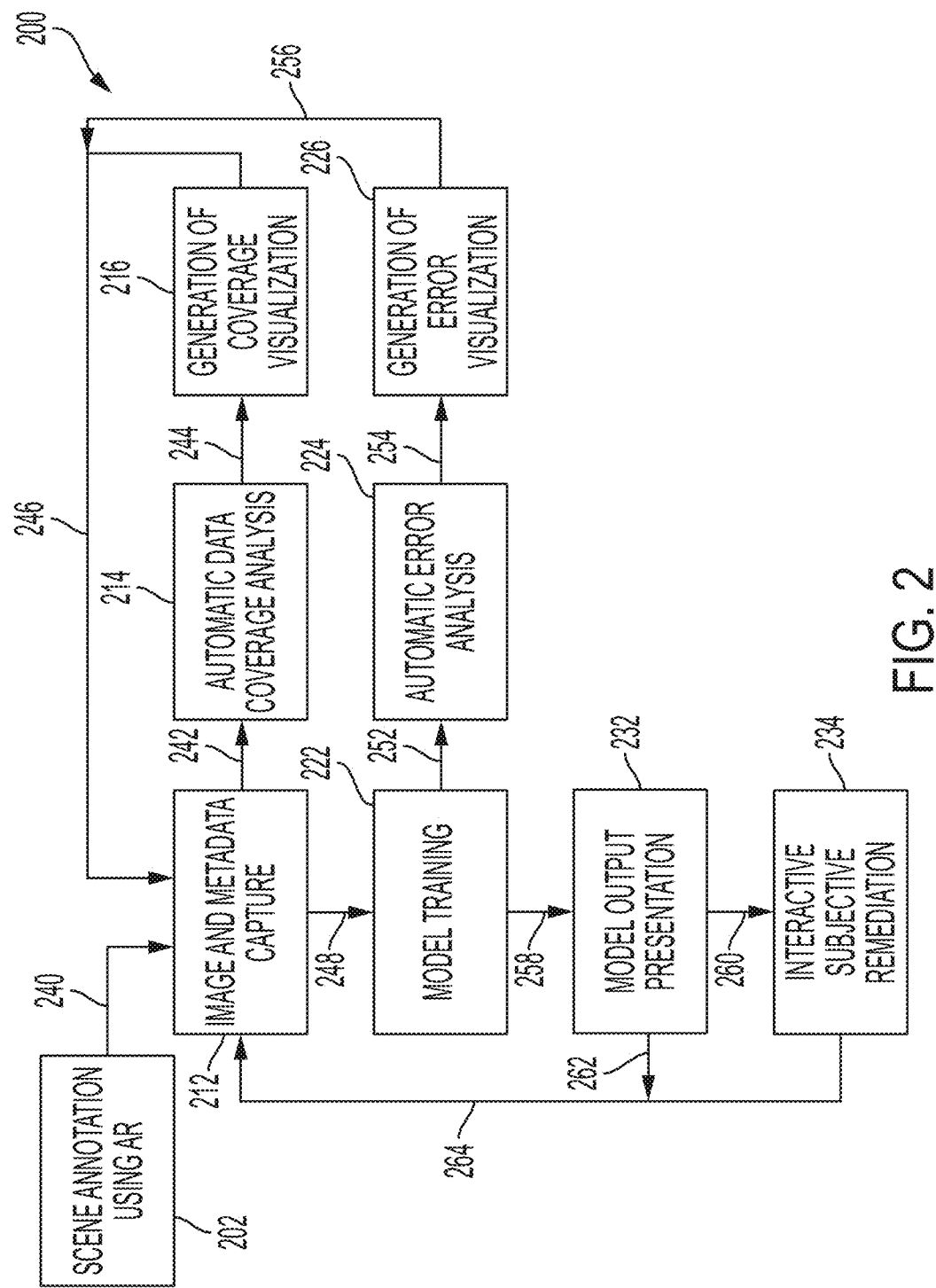
FIG. 2 presents a diagram illustrating an exemplary flow for facilitating interactive feedback in data collection for machine learning using AR, in accordance with an embodiment of the present application.

FIG. 2 presents a diagram 200 illustrating an exemplary flow for facilitating interactive feedback in data collection for machine learning using AR, in accordance with an embodiment of the present application. During operation, a user can annotate a scene using AR (module 202), e.g., by using a recording device with AR features (similar to function 132 of FIG. 1). The user can place AR annotations which indicate the location of objects of interest in the scene, for future object detection using a trained model. An exemplary method of placing AR annotations is to enclose an object within the boundaries of a 3D cube. Other shapes and methods are possible.

Figure 3:
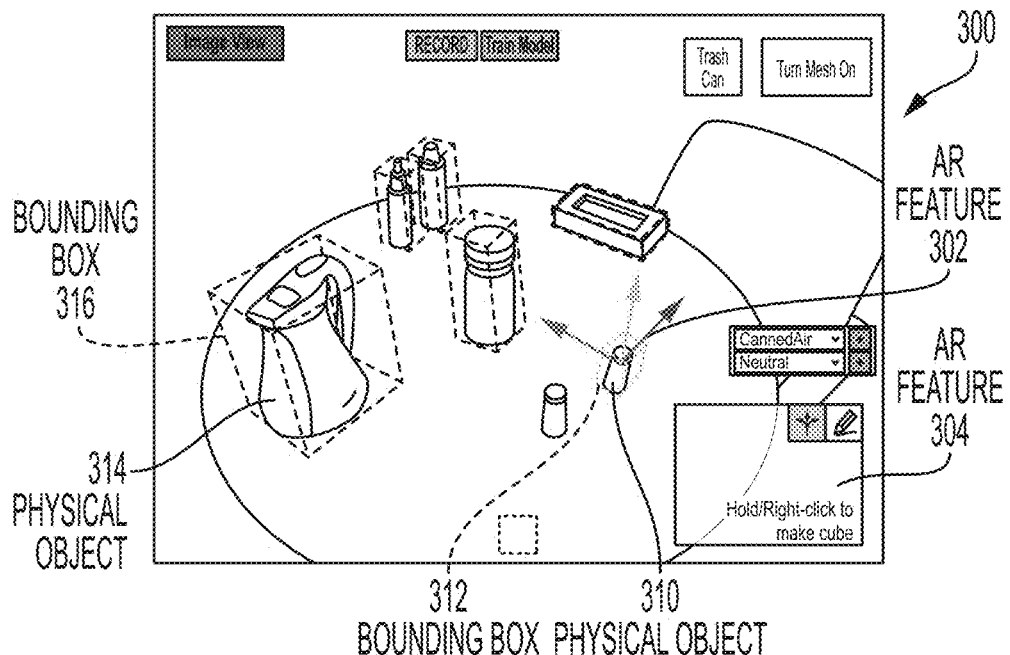
FIG. 3 illustrates a scene as viewed via a display of an AR device, including 3D cube annotations placed over several objects indicating their location in the scene, in accordance with an embodiment of the present invention.

FIG. 3 illustrates a scene 300 as viewed via a display of an AR device, including 3D cube annotations placed over several objects indicating their location in the scene, in accordance with an embodiment of the present invention. Scene 300 can include multiple objects, e.g., a physical object 310 which is a pepper shaker and a physical object 314 which is a tea kettle. Scene 300 indicates that a bounding box 316 has been placed around physical object 314 and that a bounding box 312 has been placed around physical object 310. An AR feature 305 can indicate how to create the bounding box or cube, e.g., using natural 3D handles controlled by figure gestures such as translate, rotate, and scale. Some annotation tools allow the user to place vertices along the boundaries of objects which can be used to define the object extents. When object has been bounded or "localized," the user can provide a label description of the object (e.g., "tea kettle," "salt shaker," "pepper shaker," "door," "light switch," etc.) as well as a state (e.g., "neutral," "off," "on," "open," "closed," etc.). An exemplary annotation tool is described in the '165 and '457 patents. The user-provided description can be included as part of the metadata captured by the recording device.

Image and Metadata Capture

Returning to FIG. 2, the annotations can be fed into an image and metadata capture module (via a communication 240). The user can now move around the scene and capture additional images, e.g., by taking video of the annotated objects while the system tracks the recording device and the annotated objects in the common 3D coordinate space. The system can project the annotations in 3D space to each individual frame of the video as the user walks around the scene, as described in the '165 and '457 patents. These projected annotations can be based on the position of the recording device and can enable automatic labeling at a rate of, e.g., 30 frames per second.

Figure 4:
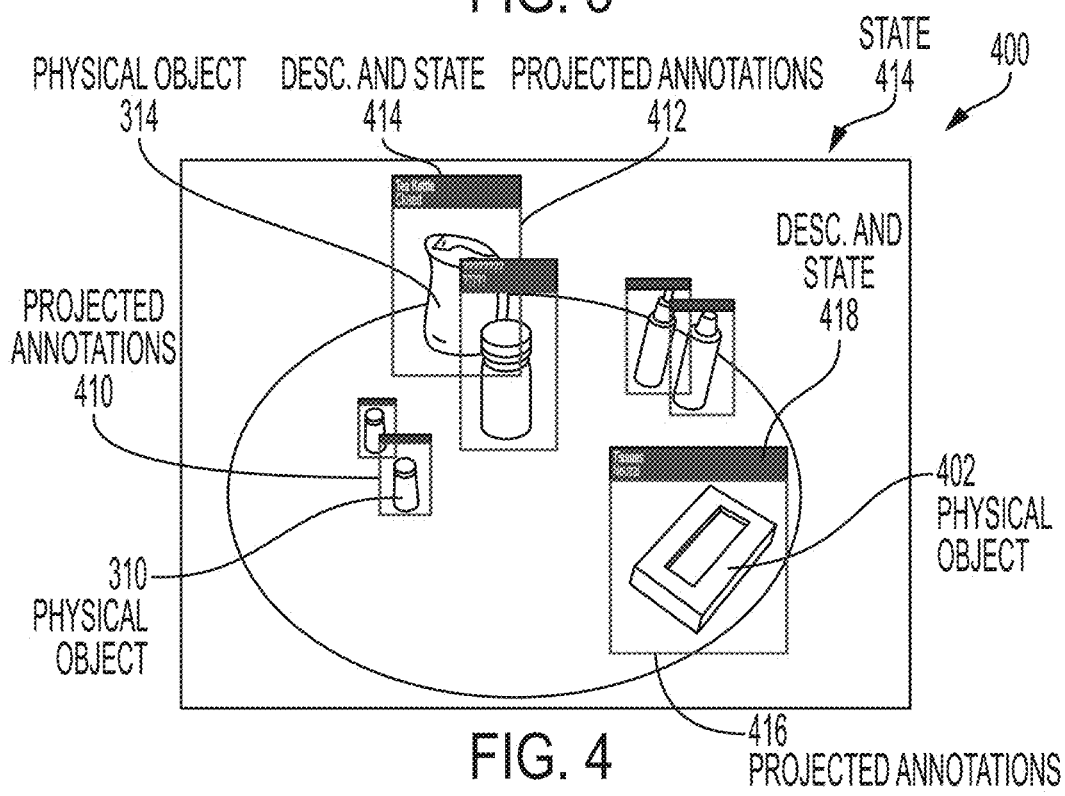
FIG. 4 illustrates a scene as viewed via a display of an AR device, including projections of the 3D cube annotations from FIG. 3 placed over the corresponding objects in a different view, in accordance with an embodiment of the present invention.

FIG. 4 illustrates a scene 400 as viewed via a display of an AR device, including projections of the 3D cube annotations from FIG. 3 placed over the corresponding objects in a different view, in accordance with an embodiment of the present invention. In scene 400, a 2D bounding box is projected onto the previous user-annotated objects, along with the user-defined descriptions and states. For example, projected annotations 410 are displayed around physical object 310 (pepper shaker). Similarly, projected annotations 412 are displayed around physical object 314 (tea kettle) along with a description and state 414 (of "Tea kettle" and "Closed"). As another example, projected annotations 416 are displayed around a physical object 402 along with a description and state 418 (of "Tissues" and "Neutral"). The projected annotations of FIG. 4 and the instant embodiments can be based on recording the coordinates of bounding boxes in the common 3D world frame, which allows the system to know where the bounding boxes appear relative to the recording device at all times. This 3D world frame can persist across collection sessions, which can allow the user to accumulate data from multiple runs or passes. As described above, the user can explicitly provide a label description and a state of an object. The user can also explicitly provide other metadata, such as a lighting condition, occlusion information, and blur information, or that metadata may be captured or provided by the recording device.

Automatic Data Coverage Analysis (Measuring a Level of Diversity)

Returning to FIG. 2, the obtained images (with metadata) can be input into an automatic data coverage analysis module 214 (via a communication 242), which can measure a level of diversity of the images obtained in module 212 based on the scene characteristics, including but not limited to: a distance and angle between the recording device and the physical object in a respective image; a lighting condition associated with the respective image; a percentage of occlusion of the physical object in the respective image; and an amount of blur associated with the physical object in the respective image. Module 214 can calculate a series of statistical profiles for each object that can be used to measure the level of diversity found across all images based on the above-described scene characteristics.

Module 214 can perform the automatic data coverage analysis based on the distance and angle between the recording device and the physical object. Given both the 3D coordinates of bounding boxes for every object of interest in the scene as well as the camera position and orientation in the 3D world frame, module 214 can compute both the distance of the camera to the object and the orientation of the camera with respect to the object's coordinate system for each frame or image. Module 214 can compute the centroid of a bounding box by average the n points $\{(x_1,y_1,z_2), (x_2,y_2,z_2) \ldots (x_n,y_n,z_n)\}$ defining the bounding box of the object as follows. The average x value $x_{obj}$ can be the sum of all the x points from $x_1$ to $x_n$ divided by n. The average y value $y_{obj}$ can be the sum of all the y points from $y_1$ to $y_n$ divided by n. The average z value $z_{obj}$ can be the sum of all the z points from $z_1$ to $z_n$ divided by n.

The values of $(x_{cam}, y_{cam}, z_{cam})$ can represent the location of the camera in the 3D world frame. Module 214 can calculate the distance $d_{obj}$ as the Euclidean distance, where $d_{obj}$ is the square of the following three values: a first difference between $x_{cam}$ and $x_{obj}$, squared; a second difference between $y_{cam}$ and $y_{obj}$, squared; and a third difference between $z_{cam}$ and $z_{obj}$, squared.

Module 214 can also compute the horizontal or azimuth angle using the arctangent atan. The azimuth angle theta can be represented by the atan of the two following values: a fourth difference between $y_{cam}$ and $y_{obj}$; and a fifth difference between $x_{cam}$ and $x_{obj}$. The elevation angle phi can be represented by the atan of the two following values: a sixth difference between $z_{cam}$ and $z_{obj}$; and a seventh difference between $x_{cam}$ and $x_{obj}$ (where the seventh difference is the same as the fifth difference). Module 214 can bin these into solid angles to form a histogram of angle coverage, such as in a radar plot as described below in relation to FIG. 6B. In some embodiments, module 214 can compute the distance to the nearest face of the object (e.g., the Hausdorf distance), which distance may be significantly different for large objects.

Module 214 can also perform the automatic data coverage analysis based on the number of images of each object captured under various scene characteristics, such as: lighting conditions (e.g., strong lighting, normal lighting, and low lighting) which can be estimated using built-in light sensors on the recording device or using image features (e.g., histograms, color profiles, etc.).

Module 214 can further perform the automatic data coverage analysis based on whether or not each object is partially or fully occluded, or based on a percentage of occlusion of each object. For example, module 214 can use a mesh from an underlying SLAM algorithm to detect collision using ray-casting from the camera to a sample of points on the bounding box or volume of a given object. If any intersections exist with objects that are closer than the focal point, module 214 may determine that an occlusion exists. For occlusions by other annotated objects, module 214 can project the object of interest into a z-buffer and subsequently project the bounding of all other objects into a z-buffer to determine whether any significant overlap exists, where "significant" can be based on a comparison to a predetermined degree or percentage.

Module 214 can additionally perform the automatic data coverage analysis based on the amount of blur or blurriness of an image, e.g., as captured by the variation of the laplacian metric or based on focus measure operators for shape-from-focus. Module 214 can mark the amount of blur, e.g., by highlighting a result indicating that all or many (or an exact percentage) of the images are excessively blurry, where "excessive" blur may be based on a comparison to a predetermined amount of blur.

Real-Time Online Interactive Feedback: Instructions/ User Guidance to Capture Additional Images after Data Coverage Analysis Returning to FIG. 2, module 214 can output a result to a generation of coverage visualization module 216 (via a communication 244). Module 216 can use the statistical measures estimated by module 214 and guide the user to capture additional images to ensure obtaining all possible views of each object under all lighting conditions with and without occlusions and without excessive blur, in addition to other scene characteristic changes. Module 216 can provide this guidance as instructions (similar to instructions 176/198 in FIG. 1) to the user using AR features, such as arrows, waypoints, animations (e.g., to tilt the screen up/down, to move closer/further, etc.).

Figure 5A:
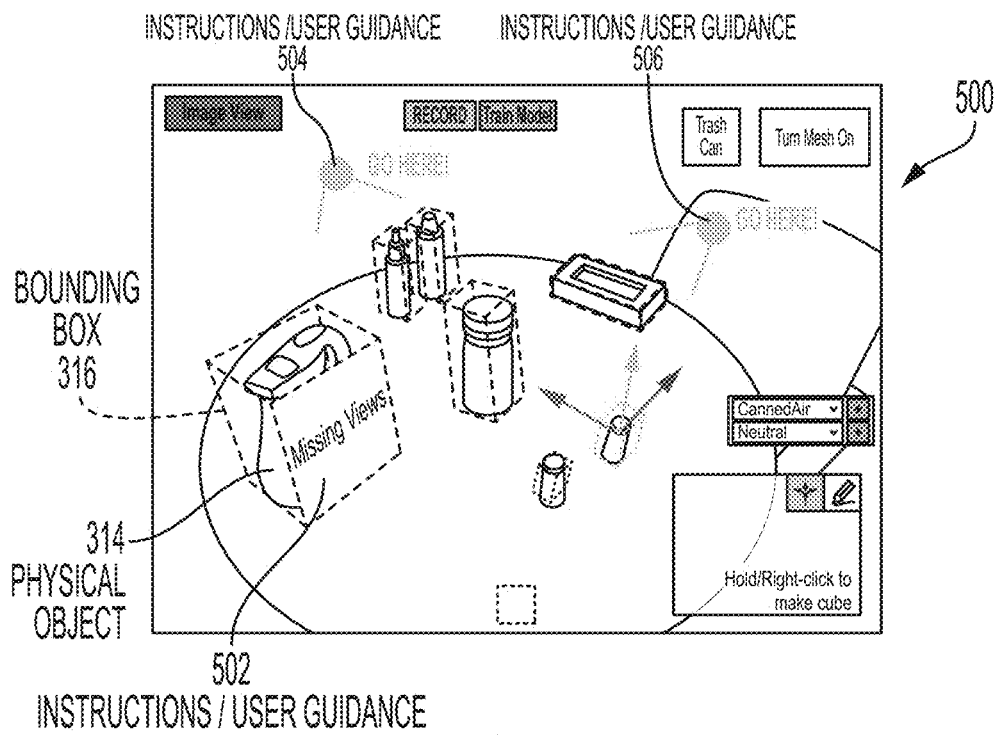
FIG. 5A illustrates a scene as viewed via a display of an AR device, similar to the scene of FIG. 3, including a visualization of instructions for capturing additional images, in accordance with an embodiment of the present invention.

FIG. 5A illustrates a scene 500 as viewed via a display of an AR device, similar to the scene of FIG. 3, including a visualization of instructions for capturing additional images, in accordance with an embodiment of the present invention. Scene 500 can include instructions/user guidance 504 and 506, depicted as waypoints with corresponding text which instructs the user to "Go Here" and capture an additional image of an object or the scene. Waypoints 504 and 506 can indicate to the user where to stand and the angle at which to hold the recording device to capture the additional images. Scene 500 can also include instructions/user guidance 502, which is a graphic displayed on a particular 3D surface of physical object 314 and labeled as "Missing View."

Figure 5B:
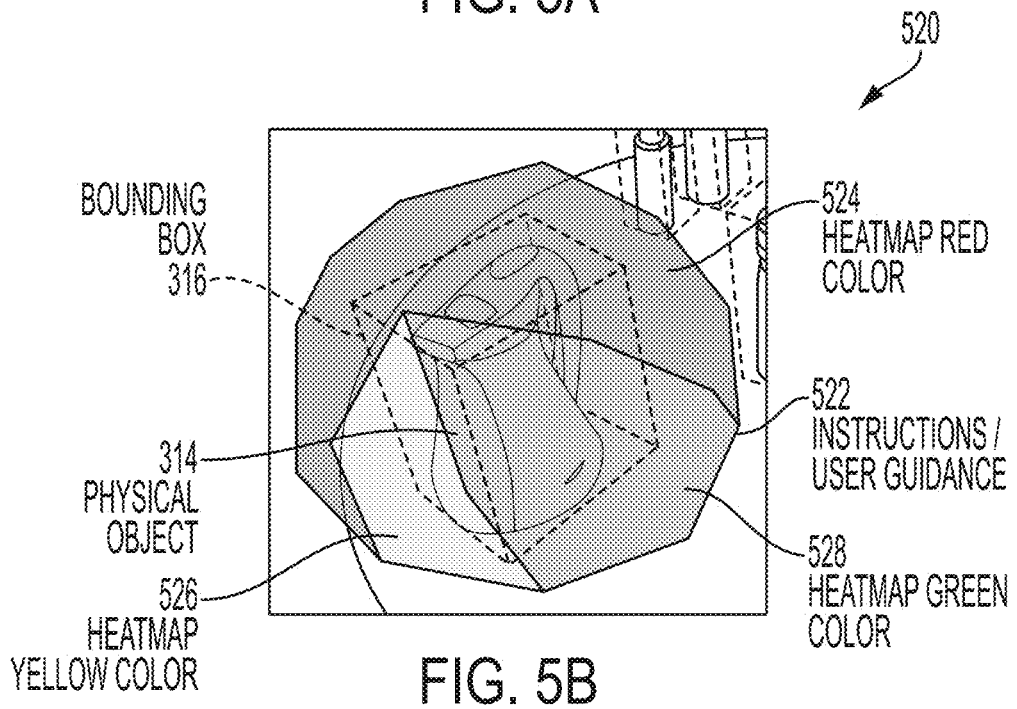
FIG. 5B illustrates a portion of the scene of FIG. 5A as viewed via a display of an AR device, including a heatmap of a geodesic polyhedron as the visualization of instructions for capturing additional images as a result of data coverage analysis, in accordance with an embodiment of the present invention.

In another example, FIG. 5B illustrates a portion of the scene of FIG. 5A as viewed via a display of an AR device, including a heatmap of a geodesic polyhedron as the visualization of instructions for capturing additional images as a result of data coverage analysis, in accordance with an embodiment of the present invention. The heatmap can indicate the total coverage of each object. Module 216 can bin the viewing directions by intersecting the viewing directions with the polygonal faces on the geodesic polyhedron (or the icosphere mesh). Module 216 can determine the color of a given face by the number of views in that direction divided by the desired number of views, which can be capped at a maximum value of 1.0. Module 216 can then use this real value score for color-mapping.

Specifically, instructions/user guidance 522 can indicate the heatmap as a geodesic polyhedron, with various colors on one or more face representing different statuses of coverage of the image. For example, a heatmap red color 524 can indicate that images have not yet been captured from that view and still need to be captured. A heatmap yellow color 526 can indicate that the user is currently looking at the object from that view, but that images have not yet been captured from that view. A heatmap green color 528 can indicate that the user has already captured images from that view. While three colors are indicated in FIG. 5B, a greater or lesser number of colors or other distinguishing indicators (such as shading, lines, fill, etc) can be used to indicate one or more statuses relating to the data coverage analysis for an object in the scene.

Based on the instructions generated by module 216 and displayed on the recording device (e.g., instructions 176/198), the user can capture additional images, which are input into module 212 and stored as part of the collected data (via a communication 246).

Offline Feedback

Figure 6A:
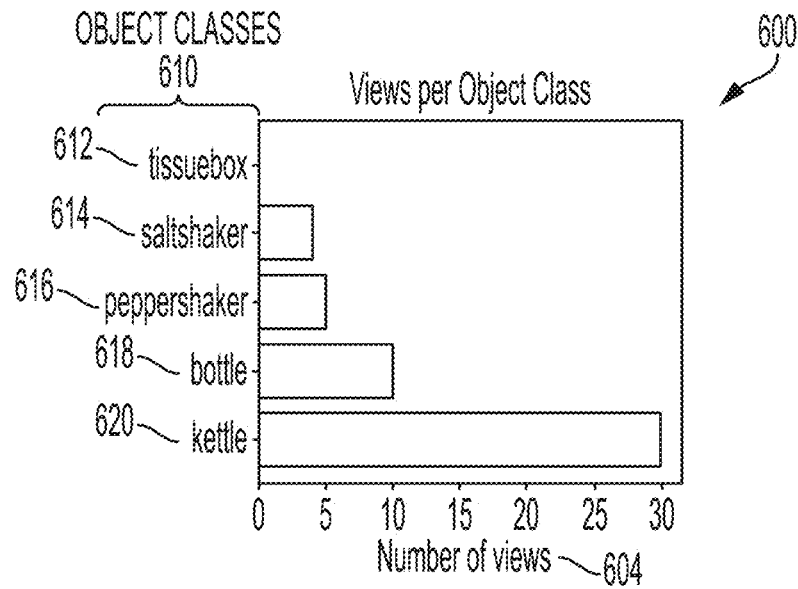
FIG. 6A illustrates a table summarizing the distribution of views per object class, in accordance with an embodiment of the present invention.

Module 216 can also generate summary reports which characterize the completeness of a collected dataset as a whole. FIG. 6A illustrates a table 600 summarizing the distribution of views per object class, in accordance with an embodiment of the present invention. Table 600 depicts a number of views 604 for various object classes 610, which can include: a tissue box 612; a salt shaker 614; a pepper shaker 616; a bottle 618; and a kettle 620. By viewing table 600, the user can quickly determine that the tissue box has not yet been covered at all (i.e., no images have been captured at all), while both the salt shaker and the pepper shaker may need more coverage (i.e., additional images are required). Table 600 can be presented to the user as part of an offline feedback process. In some embodiments, module 216 can present table 600 to the user as part of first instructions 176 which are displayed as display AR data 198 on the recording device in real-time as the user moves around the scene.

Figure 6B:
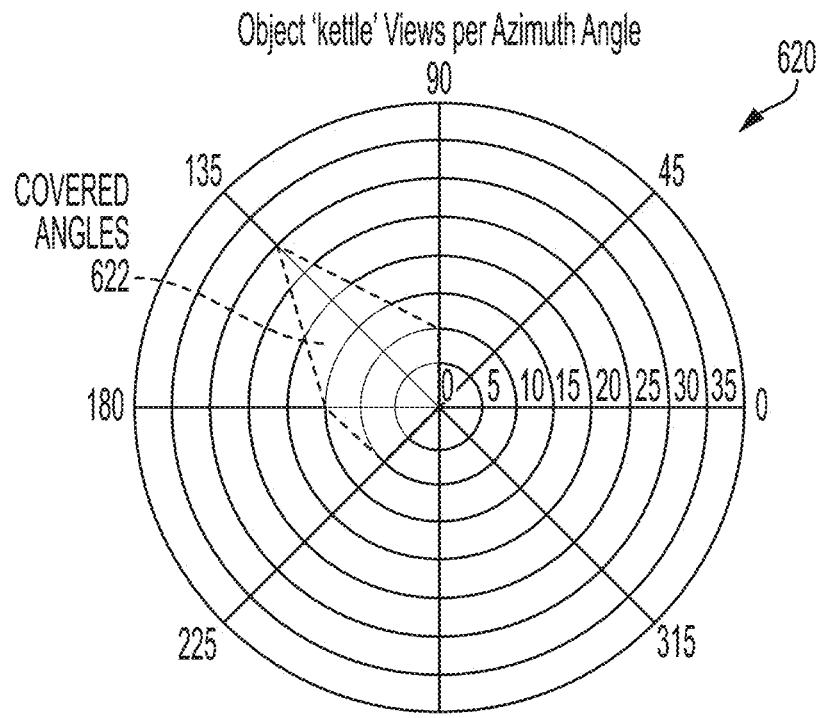
FIG. 6B illustrates a radar plot indicating a number of views per azimuth angle taken of an object, in accordance with an embodiment of the present invention.

FIG. 6B illustrates a radar plot 620 indicating a number of views per azimuth angle taken of an object, in accordance with an embodiment of the present invention. Radar plot 620 can include angles depicted at 45-degree intervals from 0 to 315 to 0 (or 360). Radar plot 620 can pertain to the views of the object "kettle" per azimuth angle and can indicate by a color (or other distinguishing visual indicator) covered angles 622, which can represent the angles which are covered by already-captured images. Similar to table 600, radar plot 620 can be presented to the user as part of an offline feedback process. In some embodiments, module 216 can present radar plot 620 to the user as part of first instructions 176 which are displayed as display AR data 198 on the recording device in real-time as the user moves around the scene.

Module 216 can also generate a final report (not shown) which lists the status of each object as complete or not, which can allow the user to easily view the status of all objects in the collected dataset. This final report can also indicate a "percentage complete" bar, including a number of images remaining which need to be captured to reach completeness, as well as the various corresponding scene characteristics, such as views (distance and angle), lighting conditions, occlusion conditions, and blur conditions. Module 216 can store these statistics, e.g., as part of data coverage analysis information 182 in FIG. 1, and use these statistics to certify or validate the coverage of the collected dataset. An enterprise object tracking pipeline can also use these statistics as part of its workflow, where all datasets may need to meet performance metrics defined by module 216 or set by a user of the system.

Modules 214 and 216 can collaborate to merge two datasets by analyzing the coverage of the union on binned coverage data using an analog of an intersection over union (IOU) metric. The result of such an analysis can indicate whether or not the additional data broadens the coverage of an object or objects in the scene.

Model Training and Automatic Error Analysis

Returning to FIG. 2, once a certain amount of data is collected (e.g., based on whether the measured level of diversity is greater than a first predetermined threshold), module 212 can output the collected dataset to a model training module 222 (via a communication 248). Module 222 can train a model based on the collected data either based on the measured level of diversity or responsive to receiving a request from a user associated with the recording device (e.g., a command 174 to perform error analysis as in FIG. 1). Module 222 can output the trained model to an automatic error analysis module 224 (via a communication 252). Modules 222 and 224 in collaboration can perform the error analysis as described herein.

Modules 222/224 can combine multiple folds of cross-validation in training the model, with an output or end goal of estimating an error rate for each image of the collected data. In each fold, the collected data can be randomly split into a training set and a test set. Module 222 can train the model on the training split and then on the test set. Modules 222/224 can repeat this process for multiple different random splits of the dataset. This cross-validation can be performed using multiple nodes in a cloud-based system. Modules 222/224 can combine the multiple folds to estimate the probability error of the model for each image. Because the system stores or calculates the scene characteristics for each image, module 224 can calculate the error rate based on any coverage dimension, i.e., based on any scene characteristic. The user can then use this error rate information to focus further data capture efforts (e.g., via summary reports or other displayed instructions).

Module 224 can output the error rate information (and other error analysis information) to a generalization of error visualization module 226 (via a communication 254). Module 226 can use the error rate information and guide the user to capture further images to ensure that all identified errors in capturing images are properly addressed. Module 226 can provide this guidance as instructions (similar to instructions 178/198 in FIG. 1) to the user using AR features, similar to those described in FIGS. 5A and 5B.

Figure 7:
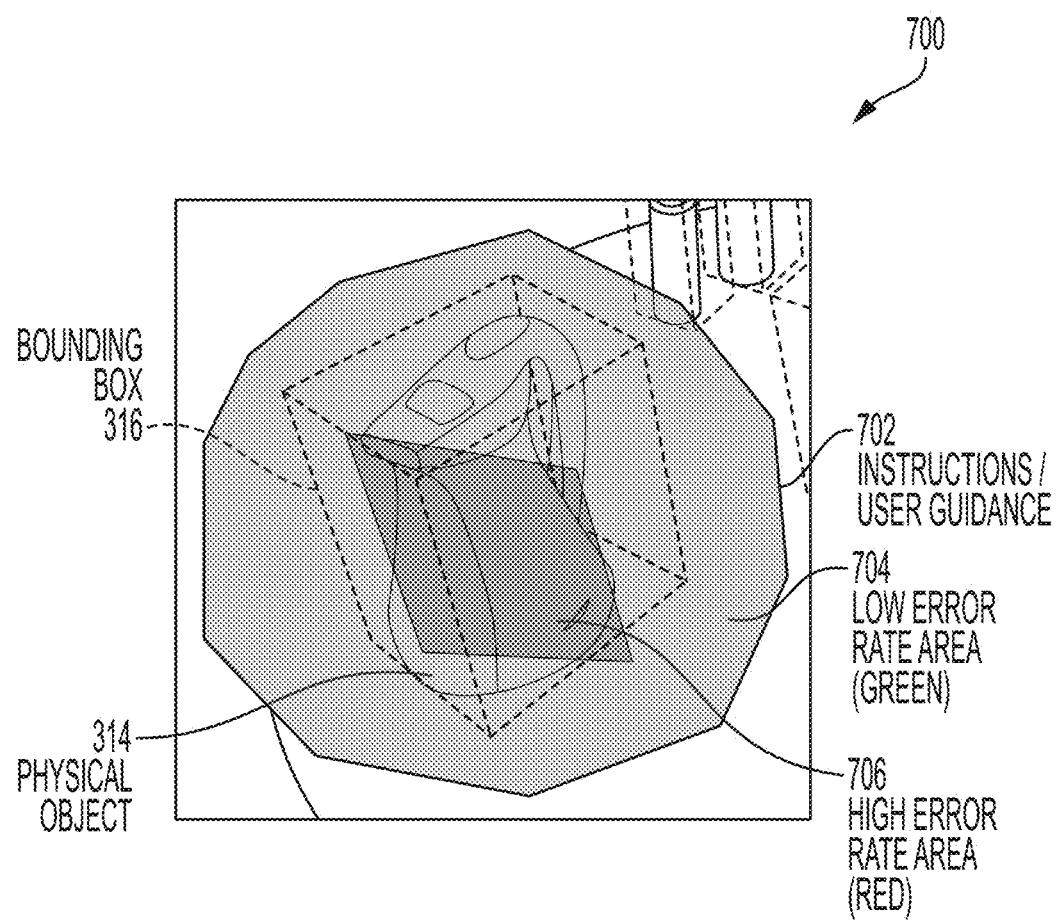
FIG. 7 illustrates a portion of the scene of FIG. 5A as viewed via a display of an AR device, including a heatmap of a geodesic polyhedron as the visualization of instructions for capturing further images as a result of error analysis, in accordance with an embodiment of the present invention.

Real-Time Online Interactive Feedback: Instructions/User Guidance to Capture Further Images after Error Analysis As another example, FIG. 7 illustrates a portion of the scene of FIG. 5A as viewed via a display of an AR device, including a heatmap of a geodesic polyhedron as the visualization of instructions for capturing further images as a result of error analysis, in accordance with an embodiment of the present invention. Similar to the heatmap of FIG. 5B, the heatmap of FIG. 7 can indicate the error analysis or error rate coverage of each object. Specifically, instructions/user guidance 702 can indicate the heatmap as a geodesic polyhedron, with various colors on one or more face representing different error rates for coverage of the image. For example, a low error rate area (green) 704 on one or more faces of the polyhedron can indicate an error rate below a first predetermined error rate, and a high error rate area (red) 706 on one or more other faces of the polyhedron can indicate an error rate above a second predetermined error rate. The first and second predetermined error rates can be set by the system as a default or based on various factors, or set by the user based on other factors.

As with FIG. 5B, while only two colors are indicated in FIG. 7, a greater or lesser number of colors or other distinguishing indicators (such as shading, lines, fill, etc) can be used to indicate one or more error rates or ranges of error rates relating to the error analysis for an object in the scene.

Based on the instructions generated by module 226 and displayed on the recording device, the user can capture further images, which are input into module 212 and stored as part of the collected data (via a communication 256). Communications 246 and 256 can represent the interactive feedback between the system and the user. The interactive feedback can relate to the automatic data coverage analysis performed by module 214, the first instructions generated by module 216 and displayed on the recording device, and the additional images captured by the user and sent as feedback via communication 246. The interactive feedback can also relate to the automatic error analysis performed by module 224, the second instructions generated by module 226 and displayed on the recording device, and the further images captured by the user and sent as feedback via communication 256.

In addition, after additional and further images are captured by module 212, or based on the measured level of diversity, module 222 can train the model with the additional/further images of the collected data. Module 214 (automatic data coverage analysis) and module 224 (automatic error analysis) can run in parallel and based on various conditions, as described herein and below in relation to FIGS. 8A-C.

Results of Model Training; Interactive Subject Mediation

Module 222 can output results to a model output presentation module 232 (via a communication 258). Module 232 can display these results to the user (online or offline) as visual outputs which indicate the running and currently trained model. For example, module 222 may use a validation dataset which is a percentage (such as 20%) of the collected dataset or from the training set. Module 222 can train the model, and if the performance of the model is determined to be below a predetermined level, module 232 can indicate to the user that more data needs to be collected (i.e., more images need to be captured). Module 232 can present a mean average precision in a confusion matrix which is broken down by one or more particular scene characteristics, such as the view (distance and angle), lighting condition, percentage of occlusion, and amount of blur. The user can then capture the more images as indicated by module 232 (via a communication 262, which represents another interactive feedback mechanism of the described embodiments).

Upon viewing the results of module 232, the user can perform an interactive subjective remediation (depicted via a communication 260 from module 232 to a module 234), i.e., a subjective human judgment. For example, a user may determine, after reviewing the results of module 232, that a certain image (based on certain viewing, lighting, and blur conditions) is not as clear as it could be. The user may then capture another image, which can be sent to module 212 (via a communication 264) to be included as additional collected data. As another example, the user may determine that a first physical object has a higher priority than a second physical object, and thus may determine to capture more images of the first physical object, which are again sent to module 212 and stored as part of the collected data. Communication 264 also represents another interactive feedback mechanism of the described embodiments.

In some embodiments, upon viewing the output of the trained model (module 222) as per the model output presentation (module 232), where the model is loaded into a data capture tool, the user may view in real-time the scene from multiple views. The scene can include multiple physical objects which are associated with multiple sets of collected data comprising images of a given object, as depicted above in relation to FIGS. 1, 3, 4, and 5A. The user can thus see which of the multiple objects are detected and whether the first or the second instructions appear on the display of the data capture tool (or recording or AR device). If a particular object is not detected or if an additional image based on the first instructions or a further image based on the further instructions needs to be captured, the user can use the data capture tool to perform at least one of: adjusting a bounding box associated with the particular object; and adding or capturing another image to be added to the collected data for the particular object.

A baseline of the embodiments is to train the model based on objects in a static 3D world view, under various conditions (e.g., based on view and pose, lighting conditions, blurriness conditions, and occlusion conditions). The result of the trained model provides a system which can detect a given object in any scene, e.g., indoors, outdoors, with other unlabeled objects occluding the given object, under various environmental (temperature, wind) and lighting conditions, etc. Thus, the described embodiments are not limited by the environment or scene in which the initial data is captured and upon which the initial model is trained. The described embodiments may be used outside of the scene and 3D world coordinate frame in which the collected dataset of images are taken of the given object.

As a result, a sufficient amount of diversity in the "required conditions" must exist in order to for scale the system for an end user. The underlying goal of these required conditions may be to capture as much diversity as may exist in the real world such that the system may be used in practical and concrete applications. One practical application is guiding users in the field to troubleshoot problems or repair issues with a device such as a printer. Another practical application is to be able to identify an object in any environment, e.g., a previously labeled device on a cluttered desktop or counter of a user at home.

Upon training the model, the described embodiments can also perform "hard negative mining," in which the system can run each collected and (user- or system-) annotated image through the trained model to automatically determine whether each object has been successfully detected. For example, hard negative mining on a trained model for the scene of FIGS. 3 and 4 can include a determination of whether the "kettle" object was truly detected as "kettle" and not as a "salt shaker" (where these two objects would be classified by the trained model in two different spaces). Thus, identifying a hard negative can indicate a true error. A missed detection can be broken down by any dimension of coverage or scene characteristic, e.g., pose, view, lighting condition, blur, occlusion, etc. The system can provide instructions to the user (e.g., a view, waypoint, heatmap, radar plot, histogram, etc., as described herein) to collect certain images in order to resolve the confusion caused by the identified hard negative. The system can provide the hard negatives are part of error analysis and, in some embodiments, can mark the instructions as "invalid" or "faulty" images versus "missing" images which need to be captured.

Figure 8A:
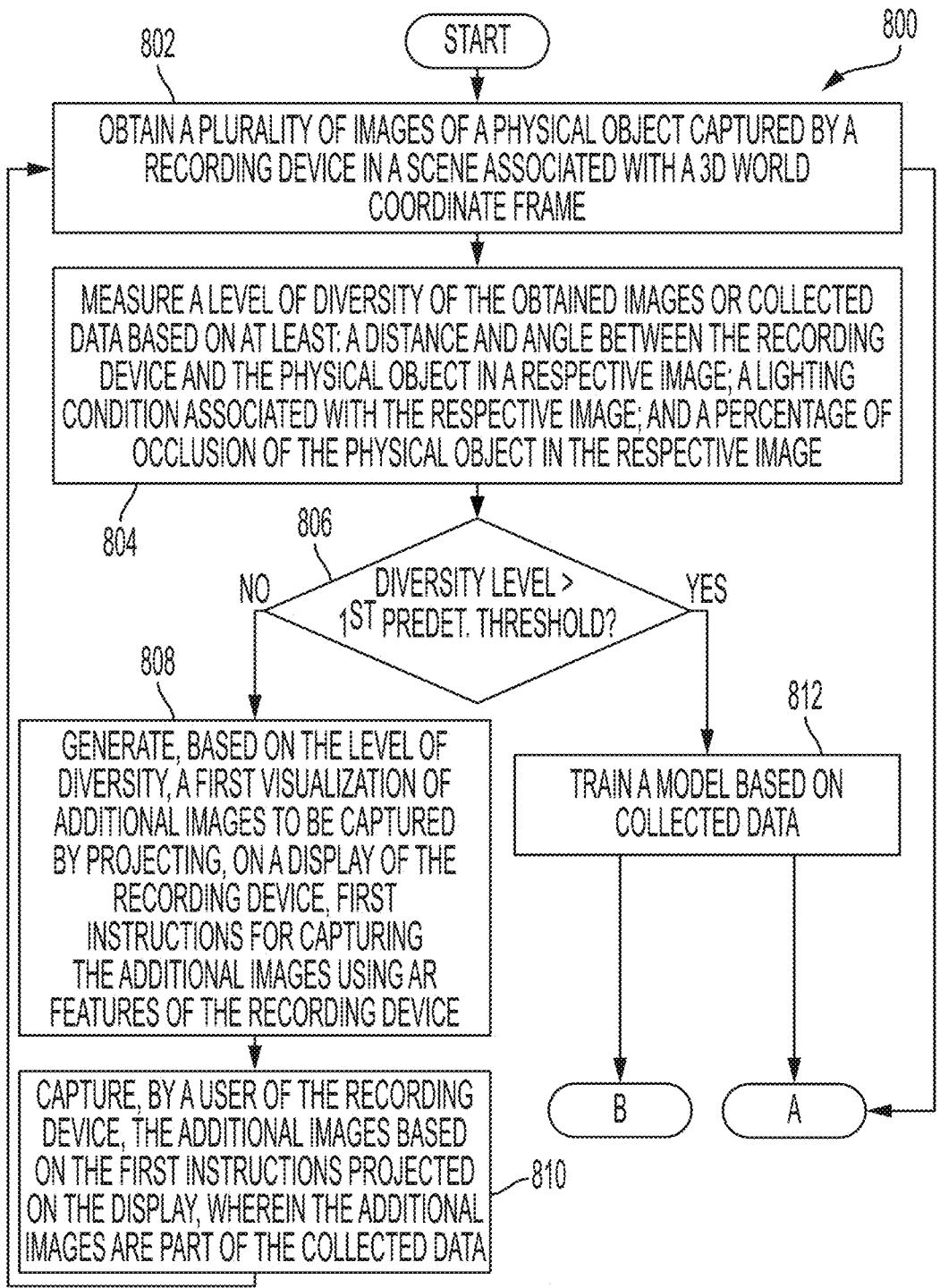
FIG. 8A illustrates a flowchart illustrating a method for facilitating interactive feedback in data collection for machine learning using AR, including data coverage analysis, in accordance with an embodiment of the present invention.

Method for Facilitating Interactive Feedback in Data Collection for Machine Learning Using AR FIG. 8A illustrates a flowchart 800 illustrating a method for facilitating interactive feedback in data collection for machine learning using AR, including data coverage analysis, in accordance with an embodiment of the present invention. During operation, the system obtains a plurality of images of a physical object captured by a recording device in a scene associated with a 3D world coordinate frame (operation 802). The system measures a level of diversity of the obtained images or collected data based on at least: a distance and angle between the recording device and the physical object in a respective image; a lighting condition associated with the respective image; and a percentage of occlusion of the physical object in the respective image (operation 804). The system can also measure the level of diversity based on metadata, which includes the above-described characteristics of angle/distance, lighting, and occlusion, and can also include an amount of blur associated with the respective image and a state of the physical object in the respective image. If the measured level of diversity is not greater than a first predetermined threshold (decision 806), the system generates, based on the level of diversity, a first visualization of additional images which need to be captured by projecting, on a display of the recording device, first instructions for capturing the additional images using augmented reality (AR) features of the recording device (operation 808). A user of the recording device captures the additional images based on the first instructions projected on the display, wherein the additional images are part of the collected data (operation 810). The operation continues at operation 802, and the obtained images comprise the collected data, including the additional images captured in operation 810.

If the measured level of diversity is greater than the first predetermined threshold (decision 806), the system trains a model based on collected data (including the obtained images and the additional images) (operation 812). The operation can continue at either or both of Label A of FIG. 8B (error analysis) and Label B of FIG. 8C (interactive subjective remediation). In some embodiments, upon obtaining the plurality of images or collected data (as in operation 802), the operation can proceed by continuing at Label A of FIG. 8C (error analysis).

Figure 8B:
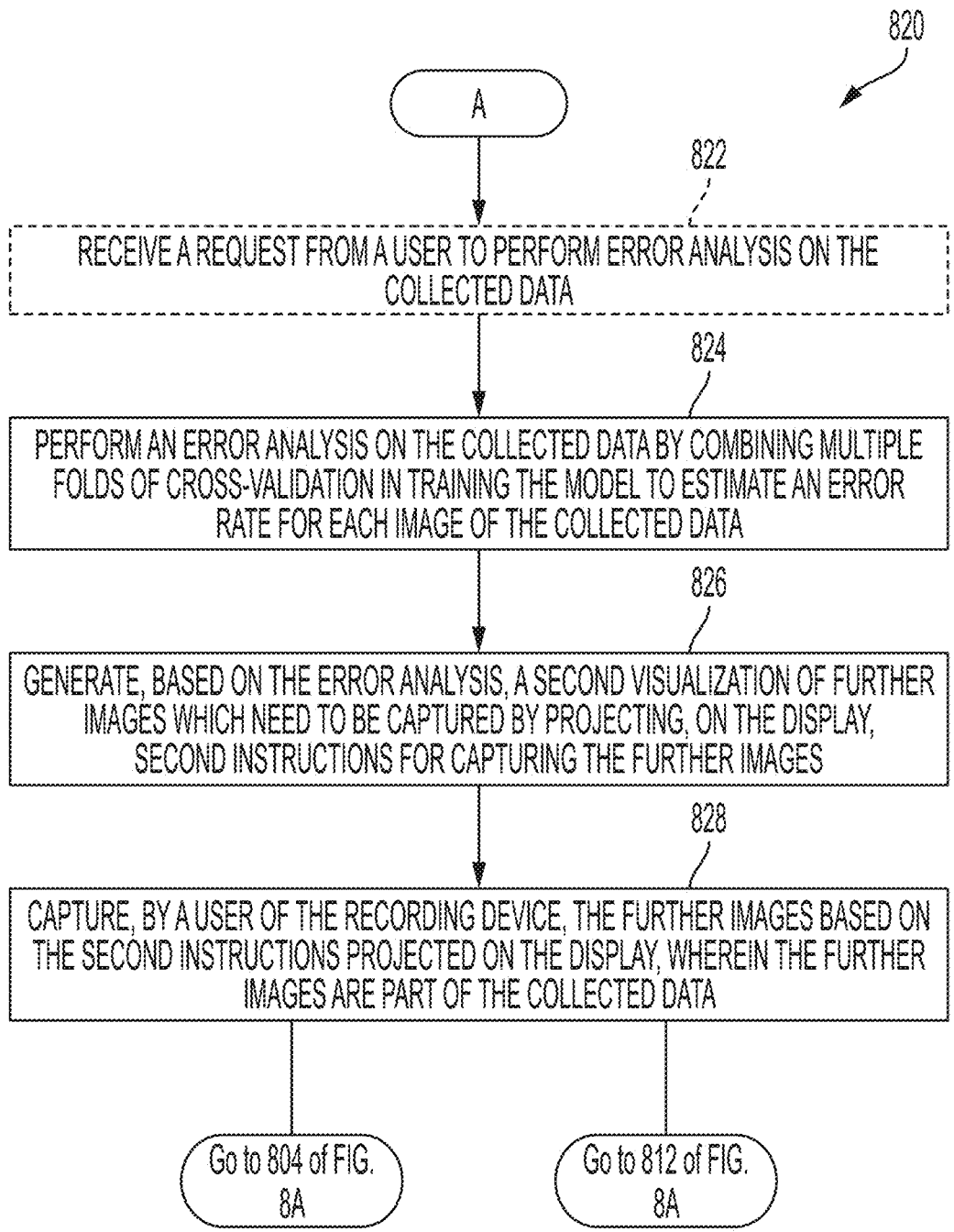
FIG. 8B illustrates a flowchart illustrating a method for facilitating interactive feedback in data collection for machine learning using AR, including error analysis, in accordance with an embodiment of the present invention.

FIG. 8B illustrates a flowchart 820 illustrating a method for facilitating interactive feedback in data collection for machine learning using AR, including error analysis, in accordance with an embodiment of the present invention. In some embodiments, the system can receive a request from a user to perform error analysis on the collected data (operation 822, indicated with dashed lines as an optional step). The system performs an error analysis on the collected data by combining multiple folds of cross-validation in training the model to estimate an error rate for each image of the collected data (operation 824). The system generates, based on the error analysis, a second visualization of further images which need to be captured by projecting, on the display, second instructions for capturing the further images (operation 826). The user of the recording device captures the further images based on the second instructions projected on the display (operation 828). As described above, the further images are part of the collected data. The operation can then continue at operation 804 of FIG. 8A (measuring the level of diversity of the collected data for data coverage analysis) or at operation 812 of FIG. 8A (training the model further based on the collected data).

Figure 8C:
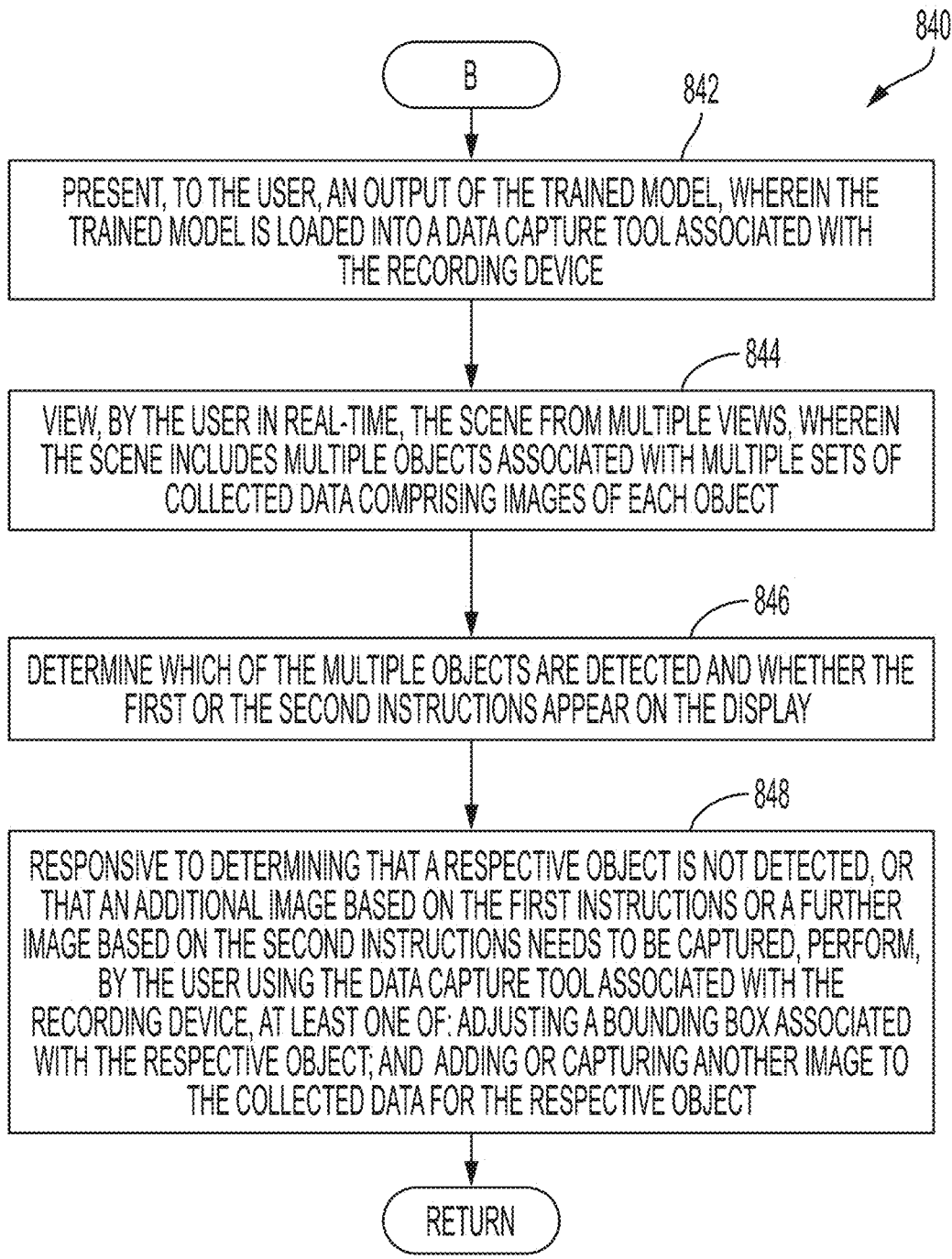
FIG. 8C illustrates a flowchart illustrating a method for facilitating interactive feedback in data collection for machine learning using AR, including interactive subjective remediation, in accordance with an embodiment of the present invention.

FIG. 8C illustrates a flowchart 840 illustrating a method for facilitating interactive feedback in data collection for machine learning using AR, including interactive subjective remediation, in accordance with an embodiment of the present invention. During operation, the system presents, to the user, an output of the trained model, wherein the trained model is loaded into a data capture tool associated with the recording device (operation 842). The user views, in real-time, the scene from multiple views, wherein the scene includes multiple objects associated with multiple sets of collected data comprising images of each object (operation 844). The system determines which of the multiple objects are detected and whether the first or the second instructions appear on the display (operation 846). Responsive to determining that a respective object is not detected, or that an additional image based on the first instructions or a further image based on the second instructions needs to be captured, the user performs, using the data capture tool associated with the recording device, at least one of: adjusting a bounding box associated with the respective object; and adding or capturing another image to the collected data for the respective object (operation 848). The operation returns. In some embodiments, operations 842-848 are performed responsive to determining that the level of diversity of the collected data is greater than a second predetermined threshold.

Thus, the embodiments described herein provide a system which increases the efficiency collecting training data for machine learning by providing an interactive feedback mechanism which improves the coverage and quality of the data collection using AR. The increased efficiency can include a significant reduction in the amount of manual labeling required to annotate images, including multiple regions or objects of interest in the images. The system can efficiently collect training data which is both diverse (as measured by the automatic data coverage analysis) and of high quality with low error rates or missing images (as measured by the automatic error analysis). Because effective machine learning is based on the diversity and quality of training data, the embodiments described herein improve the technological field of machine learning.

Improvements to Existing Technologies

Some common forms of augmented reality (AR) in the service industry include a tethered telepresence, a visual retrieval of information, and a repair script with overlays. However, each of these results is hindered by inefficiencies. In a tethered telepresence, a remote technician may need to perform a visual inspection, which can require both connectivity and extensive human expert time. In a visual retrieval of information (e.g., the Digital Glove Box application), a camera may retrieve a model number, manual pages, or telemetry statistics. However, the output is a passive page and may be limited to a single room. In a repair script with overlays, a checklist or procedural prompt may be overlaid on a user's view, and the user can click through the overlaid view. However, the view may be expensive to create and is still mostly passive, in that the view is not able to understand the user's actions. Thus, producing stand-alone AR content currently requires extensive work (e.g., by artists, human experts, and machine learning experts) to create images and video (e.g., animation) to train a model, which can result in an inefficient system.

The embodiments described herein provide a system which increases the efficiency of collecting training data for machine learning by providing interactive feedback to improve the coverage and quality of data collection using AR. In addition to decreasing the amount of manual time and labor required to collect training data, the system can also decrease the development time of new object detection systems. Beyond bounding box coordinates, the ground truth annotation can also capture 3D information about the object location, orientation, and pose from the recording device. The collected data can thus be used for a wider set of computer vision problems, e.g., estimation of pose, depth, size, object class, and properties such as "rough" vs. "smooth."

Furthermore, embodiments of the system can quickly create large labeled datasets of parts of systems managed by customers, and use the labeled datasets to train computer vision systems. A trained system can assist service technicians with management and repair of a part of a system, and can also allow a customer to assist an end-user with repair of a system part. A differentiator between these existing tools and the proposed technology is the large amount of time needed to collect the training data for the computer vision systems encased within the existing tools. This large amount of time can be reduced to a tiny fraction (e.g., $\frac{1}{10}$) by using the embodiments of the system to collect diverse and quality training data using interactive feedback.

Other exemplary systems managed by customers can include: cars or vehicles (where the dashboard or other car part, e.g., an engine or a feature in the cabin of the car, may be a region of interest for which the customer may require assistance); and printers or other devices (where a feeder tray, output tray, control panel, or other part may be the region of interest). A customer (or an end-user) who may require assistance can take a photo of the system with his cell phone, and obtain useful information about a certain "labeled" section of the photo. For example, if a user of a vehicle experiences an issue with the vehicle, the vehicle user can capture an image of the vehicle dashboard with his mobile device, and, based on the previously generated diverse set of labeled images of the dashboard from various camera poses, the vehicle user can obtain a labeled image that may be used to assist the user in understanding how to address the issue.

Thus, by providing an interactive feedback mechanism via projected visualizations which display both real-time online and offline instructions using AR, the described embodiments facilitate a method and system which improve the coverage and quality of data collection for machine learned computer vision tasks. The described embodiments can exploit the capability of AR to collect training data from multiple perspectives with improved coverage and quality without requiring re-labeling for every new perspective of a scene. This can result in a significant reduction in the burden of labeling for training an effective computer vision system.

Exemplary Computer and Communication System

Figure 9:
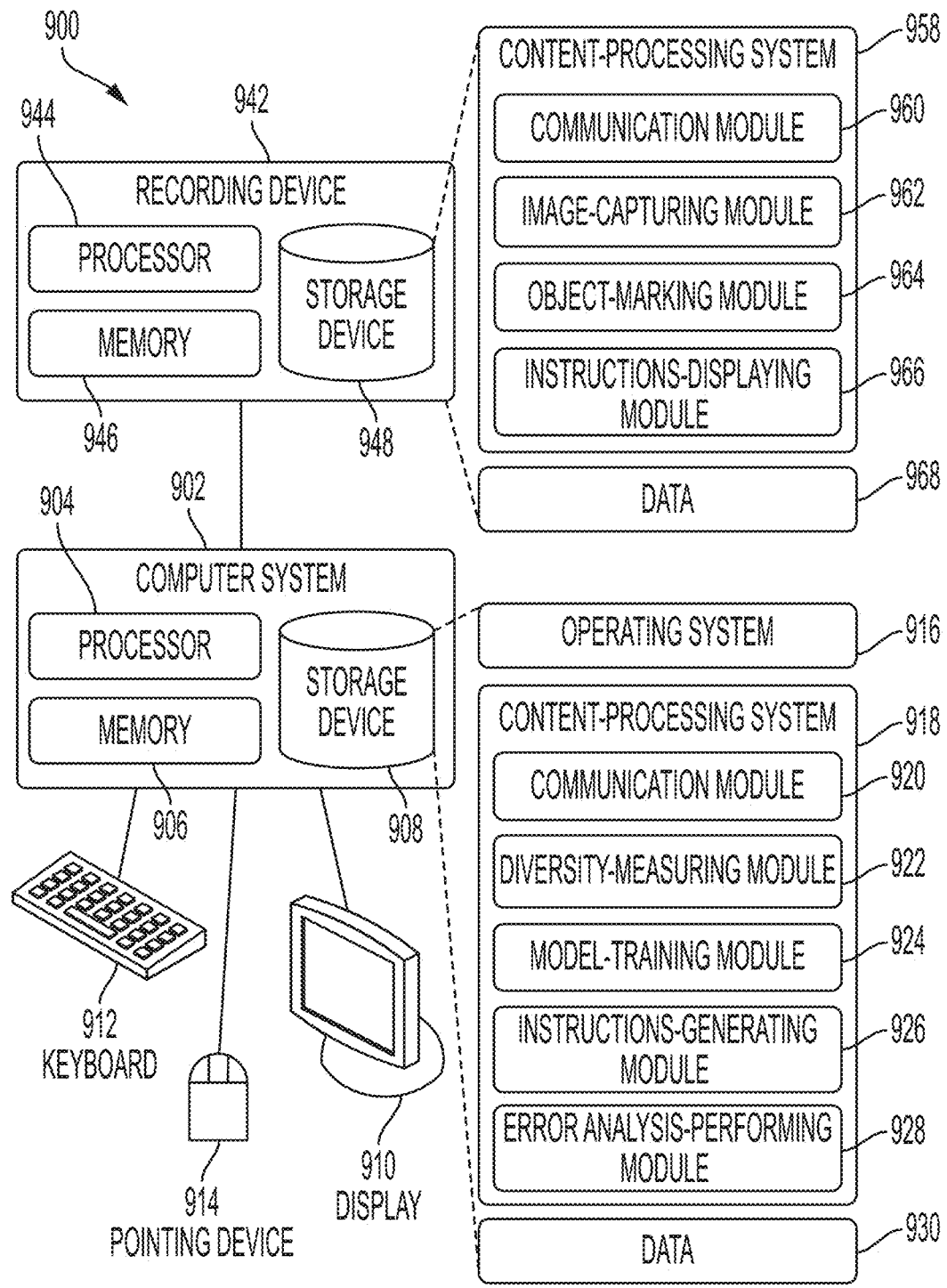
FIG. 9 illustrates an exemplary computer and communication system that facilitates interactive feedback in data collection for machine learning using AR, in accordance with an embodiment of the present invention.

FIG. 9 illustrates an exemplary computer and communication system 900 that facilitates interactive feedback in data collection for machine learning using AR, in accordance with an embodiment of the present invention. System 900 includes a computer system 902 and a recording device 942, which can communicate via a network (not shown). Computer system 902 and recording device 942 can correspond, respectively, to device 108 and device 104 of FIG. 1. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a content-processing system 918, and data 930.

Content-processing system 918 can include instructions, which when executed by computer system 902, can cause computer system 902 to perform methods and/or processes described in this disclosure. Specifically, content-processing system 918 may include instructions for sending and/or receiving/obtaining data packets to/from other network nodes across a computer network (communication module 920). A data packet can include an image, a video, a video frame, 3D coordinates of a vertex, information about a scene or a physical object in the scene, a command, and instructions.

Content-processing system 918 can further include instructions for obtaining a plurality of images of a physical object captured by a recording device in a scene associated with a three-dimensional (3D) world coordinate frame (communication module 920). Content-processing system 918 can include instructions for measuring a level of diversity of the obtained images based on at least: a distance and angle between the recording device and the physical object in a respective image; a lighting condition associated with the respective image; and a percentage of occlusion of the physical object in the respective image (diversity-measuring module 922). Content-processing system 918 can include instructions for generating, based on the level of diversity, a first visualization of additional images which need to be captured by projecting, on a display of the recording device, first instructions for capturing the additional images using augmented reality (AR) features of the recording device (instructions-generating module 926 and instructions-displaying module 966, as described below). Content-processing system 918 can include instructions for training a model based on collected data which comprises the obtained images and the additional images (model-training module 924). Content-processing system 918 can also include instructions for performing an error analysis on the collected data by combining multiple folds of cross-validation in training the model to estimate an error rate for each image of the collected data (error analysis-performing module 928). Content-processing system 918 can include instructions for generating, based on the error analysis, a second visualization of further images which need to be captured by projecting, on the display, second instructions for capturing the further images, wherein the further images are part of the collected data (instructions-generating module 926 and instructions-displaying module 966, as described below).

Recording device 942 includes a processor 944, a memory 946, and a storage device 948. Memory 946 can include a volatile memory (e.g., RAM) that serves as a managed memory, and can be used to store one or more memory pools. Storage device 948 can store a content-processing system 958 and data 968.

Content-processing system 958 can include instructions, which when executed by recording device 942, can cause recording device 942 to perform methods and/or processes described in this disclosure. Specifically, content-processing system 958 may include instructions for sending and/or receiving/obtaining data packets to/from other network nodes across a computer network (communication module 960), such as the data packets described above in relation to communication module 920.

Content-processing system 958 can additionally include instructions for obtaining or capturing a plurality of images in a scene associated with a 3D world coordinate frame (image-capturing module 962). Content-processing system 958 can include instructions for marking, on the first image, a plurality of vertices associated with the physical object (object-marking module 964, as described further in the '165 and '457 patents). Content-processing system 958 can include instructions for projecting, on a display of the recording device, first instructions for capturing the additional images using augmented reality (AR) features of the recording device (instructions-displaying module 966). Content-processing system 958 can include instructions for projecting, on the display, second instructions for capturing the further images, wherein the further images are part of the collected data (instructions-displaying module 966).

Data 930 and 968 can include any data that is required as input or that is generated as output by the methods and/or processes described in this disclosure. Specifically, data 928 and 968 can include at least: data; collected data; an image; an image of a physical object; a collection of training data; a trained network; an image with user-created annotations; an image with system-created or automatically generated annotations; a 3D world coordinate frame; a vertex; 3D coordinates for a vertex; a scene; a characteristic of the scene; an indicator of a region of interest on a physical object; marked vertices; a projection of the marked vertices; a level of diversity; a distance and angle between a recording device and a physical object; a lighting condition associated an image; and a percentage of occlusion of a physical object in an image; a percentage of occlusion of a physical object in an image; an amount of blur associated with an image; a state of a physical object in an image; a visualization; instructions; a model; results of a data coverage analysis; results of an error analysis; a fold of cross-validation; a random split; an error rate; a first predetermined error rate; a second predetermined error rate; an estimated error rate; an annotation; metadata; user-supplied information; device-determined information; a first predetermined threshold; a second predetermined threshold; a request; a command; an indicator of an arrow, waypoint, or animation; a heatmap; a total coverage; a color; an indicator of a geodesic polyhedron; a summary report; a number of views; a radar plot; a test set of images; a training set of images; an output of a trained model; an indicator of a data capture tool; and an indicator of whether an object is detected.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
obtaining a plurality of images of a physical object captured by a recording device in a scene associated with a three-dimensional (3D) world coordinate frame;
measuring a level of diversity of the obtained images based on at least: a distance and angle between the recording device and the physical object in a respective image; a lighting condition associated with the respective image; an amount of blur associated with the physical object in the respective image; and a percentage of occlusion of the physical object in the respective image, wherein the percentage of occlusion is based on one or more of occlusions by other annotated objects in the respective image and whether any intersections exist with objects closer than a sample of points or a focal point of the physical object;
generating, based on the level of diversity, a first visualization of additional images which need to be captured by projecting, on a display of the recording device, first instructions for capturing the additional images using augmented reality (AR) features of the recording device;
training a model based on collected data which comprises the obtained images and the additional images;
performing an error analysis on the collected data by combining multiple folds of cross-validation in training the model to estimate an error rate for each image of the collected data; and
generating, based on the error analysis, a second visualization of further images which need to be captured by projecting, on the display, second instructions for capturing the further images,
wherein the further images are part of the collected data, and wherein the model is further trained based on the collected data.

2. The method of claim 1, wherein the plurality of images include annotations and are associated with metadata, wherein measuring the level of diversity is further based on the metadata, and wherein the metadata comprise at least one of:
the distance and the angle between the recording device and the physical object in the respective image;
the lighting condition associated with the respective image;
the percentage of occlusion of the physical object in the respective image;
the amount of blur associated with the respective image; and
a state of the physical object in the respective image.

3. The method of claim 2, wherein the metadata comprises at least one of:
information supplied by a user associated with capturing the respective image; and
information determined by the recording device in capturing the respective image.

4. The method of claim 1,
wherein training the model based on the collected data is responsive to determining that a level of diversity of the collected data is greater than a first predetermined threshold.

5. The method of claim 1,
wherein performing the error analysis on the collected data is responsive to receiving a request from a user associated with the recording device.

6. The method of claim 1, wherein the first instructions include one or more of:
arrows, waypoints, and animations using the AR features;
a heatmap indicating a total coverage of the physical object based on colors mapped to multiple faces of a geodesic polyhedron surrounding the physical object in the respective image;
a summary report which lists a number of views taken of the physical object and other physical objects in the scene; and
a radar plot indicating a number of views per azimuth angle taken of the physical object.

7. The method of claim 1, wherein the second instructions include:
a heatmap comprising a geodesic polyhedron with multiple faces surrounding the physical object in the respective image,
wherein a first color on a first face indicates an error rate below a first predetermined error rate and a second color on a second face indicates an error rate above a second predetermined error rate.

8. The method of claim 1, wherein performing the error analysis on the collected data comprises:
generating a respective fold of the cross-validation by:
splitting, based on a first random split, the collected data into a training set and a test set of images;
training the model on the training set of images; and
training the model on the test set of images,
wherein the first random split is different from other random splits used in generating other folds of the multiple folds of the cross-validation.

9. The method of claim 8, wherein the multiple folds are combined to estimate the error rate for each image of the collected data based on at least one of:
a class of the physical object in a respective image;
the angle of view of the physical object from the recording device in the respective image;
the distance between the recording device and the physical object in the respective image;
the lighting condition associated with the respective image;
the percentage of occlusion of the physical object in the respective image;
the amount of blur associated with the respective image; and
a state of the physical object in the respective image.

10. The method of claim 1, further comprising:
iterating through measuring the level of diversity of the collected data, generating the first visualization by projecting the first instructions for capturing additional images, and obtaining the additional images until the measured level of diversity is greater than a first predetermined threshold.

11. The method of claim 1, wherein responsive to determining that the level of diversity of the collected data is greater than a second predetermined threshold, the method further comprises:
presenting, to a user associated with the recording device, an output of the trained model, wherein the trained model is loaded into a data capture tool associated with the recording device;

viewing, by the user in real-time, the scene from multiple views, wherein the scene includes multiple objects associated with multiple sets of collected data comprising images of each object;

determining which of the multiple objects are detected and whether the first or the second instructions appear on the display; and responsive to determining that a respective object is not detected or that an additional image based on the first instructions or a further image based on the second instructions needs to be captured, performing, by the user using the data capture tool associated with the recording device, at least one of:

adjusting a bounding box associated with the respective object; and adding or capturing another image to the collected data for the respective object.

12. A computer system, the system comprising:

a processor; and a storage device storing instructions that when executed by the processor cause the processor to perform a method, the method comprising:

obtaining a plurality of images of a physical object captured by a recording device in a scene associated with a three-dimensional (3D) world coordinate frame;

measuring a level of diversity of the obtained images based on at least: a distance and angle between the recording device and the physical object in a respective image; a lighting condition associated with the respective image; an amount of blur associated with the physical object in the respective image; and a percentage of occlusion of the physical object in the respective image, wherein the percentage of occlusion is based on one or more of occlusions by other annotated objects in the respective image and whether any intersections exist with objects closer than a sample of points or a focal point of the physical object;

generating, based on the level of diversity, a first visualization of additional images which need to be captured by projecting, on a display of the recording device, first instructions for capturing the additional images using augmented reality (AR) features of the recording device;

training a model based on collected data which comprises the obtained images and the additional images;

performing an error analysis on the collected data by combining multiple folds of cross-validation in training the model to estimate an error rate for each image of the collected data; and generating, based on the error analysis, a second visualization of further images which need to be captured by projecting, on the display, second instructions for capturing the further images, wherein the further images are part of the collected data, and wherein the model is further trained based on the collected data.

13. The computer system of claim 12, wherein the plurality of images include annotations and are associated with metadata, wherein measuring the level of diversity is further based on the metadata, and wherein the metadata comprise at least one of:

the distance and the angle between the recording device and the physical object in the respective image;

the lighting condition associated with the respective image;

the percentage of occlusion of the physical object in the respective image;

the amount of blur associated with the respective image; and a state of the physical object in the respective image.

14. The computer system of claim 12, wherein training the model based on the collected data is responsive to determining that a level of diversity of the collected data is greater than a first predetermined threshold.

15. The computer system of claim 12, wherein performing the error analysis on the collected data is responsive to receiving a request from a user associated with the recording device.

16. The computer system of claim 12, wherein the first instructions include one or more of:

arrows, waypoints, and animations using the AR features;

a heatmap indicating a total coverage of the physical object based on colors mapped to multiple faces of a geodesic polyhedron surrounding the physical object in the respective image;

a summary report which lists a number of views taken of the physical object and other physical objects in the scene; and a radar plot indicating a number of views per azimuth angle taken of the physical object.

17. The computer system of claim 12, wherein the second instructions include:

a heatmap comprising a geodesic polyhedron with multiple faces surrounding the physical object in the respective image, wherein a first color on a first face indicates an error rate below a first predetermined error rate and a second color on a second face indicates an error rate above a second predetermined error rate.

18. The computer system of claim 12, wherein performing the error analysis on the collected data comprises:

generating a respective fold of the cross-validation by:

splitting, based on a first random split, the collected data into a training set and a test set of images;

training the model on the training set of images; and training the model on the test set of images, wherein the first random split is different from other random splits used in generating other folds of the multiple folds of the cross-validation.

19. The computer system of claim 18, wherein the multiple folds are combined to estimate the error rate for each image of the collected data based on at least one of:

a class of the physical object in a respective image;

the angle of view of the physical object from the recording device in the respective image;

the distance between the recording device and the physical object in the respective image;

the lighting condition associated with the respective image;

the percentage of occlusion of the physical object in the respective image;

the amount of blur associated with the respective image; and a state of the physical object in the respective image.

20. The computer system of claim 12, wherein the method further comprises:

iterating through measuring the level of diversity of the collected data, generating the first visualization by projecting the first instructions for capturing additional images, and obtaining the additional images until the measured level of diversity is greater than a first predetermined threshold.

\* \* \* \* \*